United States Patent [19]

Kim

[11] Patent Number: 4,587,419
[45] Date of Patent: May 6, 1986

[54] POSITION CONTROL DEVICE WITH DUAL MANUAL CONTROLS

[75] Inventor: Syng N. Kim, Hoffman Estates, Ill.

[73] Assignee: Wico Corporation, Niles, Ill.

[21] Appl. No.: 468,504

[22] Filed: Feb. 22, 1983

[51] Int. Cl.$^4$ .............................................. G01V 9/04
[52] U.S. Cl. .............................. 250/221; 250/231 SE
[58] Field of Search ............ 250/231 SE, 221, 211 K, 250/237 G; 340/709; 33/1 M, 1 N, 141 E, 141 R; 338/196, 199, 184; 74/471 XY, 553, 504; 384/535, 581

[56] References Cited

U.S. PATENT DOCUMENTS

| | | | |
|---|---|---|---|
| 3,304,434 | 2/1967 | Koster | 250/231 SE |
| 3,789,218 | 1/1974 | Blount | 250/237 G |
| 4,007,383 | 2/1977 | Wessner | 250/237 G |
| 4,163,323 | 8/1979 | Bud | 33/141 E |
| 4,195,938 | 4/1980 | Velazquez | 400/124 |
| 4,246,703 | 1/1981 | Robinet | 33/141 R |
| 4,404,865 | 9/1983 | Kim | 74/471 XY |
| 4,503,730 | 3/1985 | Irvin | 74/566 |
| 4,505,165 | 3/1985 | Wiczer | 74/471 XY |

Primary Examiner—David C. Nelms
Assistant Examiner—James Gatto
Attorney, Agent, or Firm—Emrich & Dithmar

[57] ABSTRACT

A position control device includes a generally rectangular, two-part housing having orthogonal walls, two of which have openings formed therein. A shaft is rotatably mounted in the housing on bearings which are respectively received in recesses in support blocks on the housing bottom. One end of the shaft projects outwardly through one of the openings and may have a knob secured thereto outside the housing. One-part and two-part shafts are disclosed. A control wheel is mounted coaxially on the shaft and projects through the other opening for manual rotation by a user. The support blocks cooperate with retainers on the housing cover to accommodate slight movement of the bearings in directions perpendicular to the plane of the control wheel opening, the shaft being resiliently biased toward that opening. The two parts of the housing cooperate to provide horizontal and vertical attachment passages for receiving fasteners so that the two orthogonal walls may respectively be attached to vertical and horizontal support surfaces.

18 Claims, 9 Drawing Figures

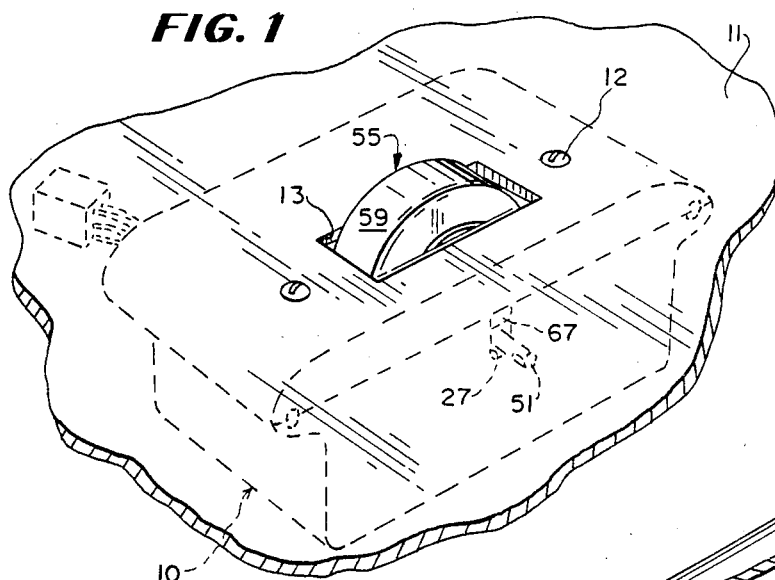
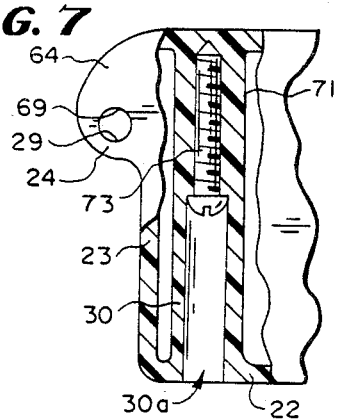
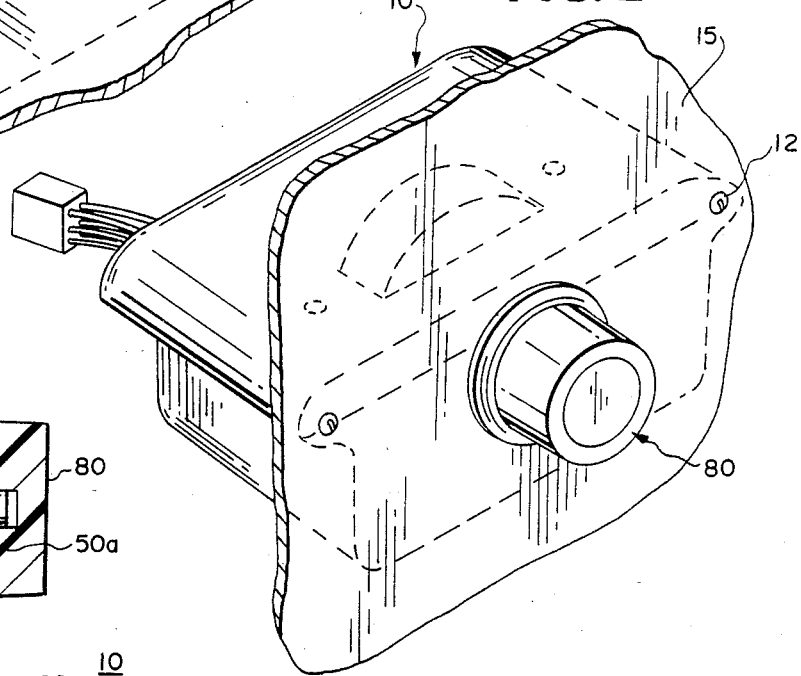
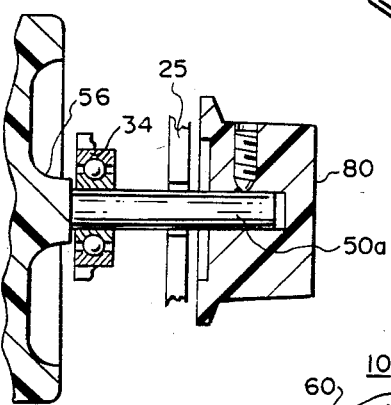
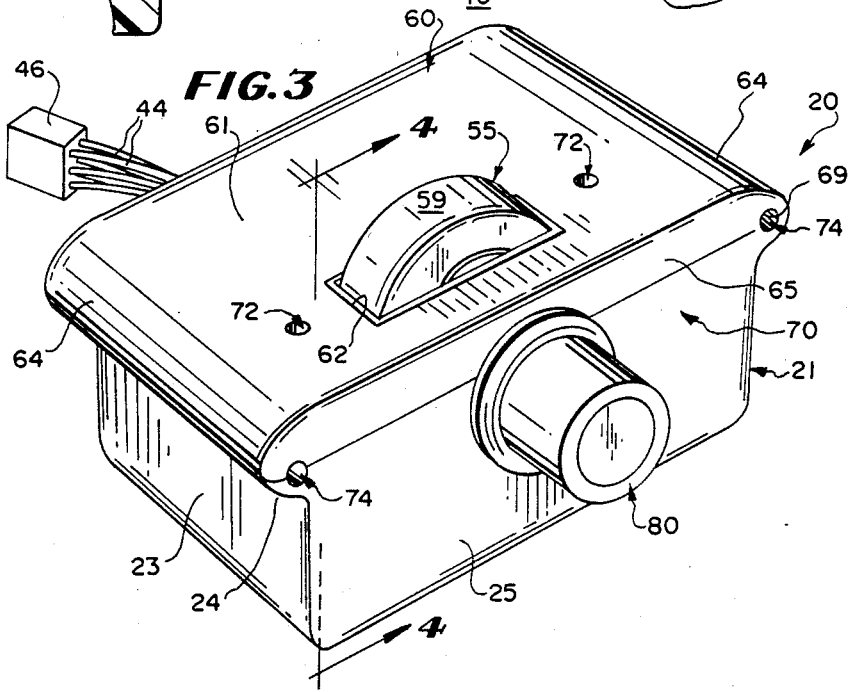
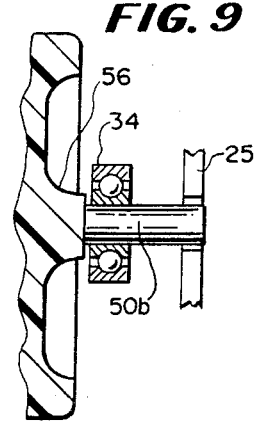

POSITION CONTROL DEVICE WITH DUAL MANUAL CONTROLS

BACKGROUND OF THE INVENTION

The present invention relates to a position control device of the type which may be used, for example, to control the movement of a cursor of a video display, as in a video game.

The invention relates in particular to position control devices for controlling position along a single axis. Such position control means is disclosed, for example, in U.S. Pat. No. 4,195,938, and includes a rotary encoder which generates position control signals in response to rotation of a shaft, the control signals indicating the speed and direction of the shaft rotation for effecting corresponding movements, such as movements of a video display cursor, along a single axis.

Devices for effecting such position control along two orthogonally related axes are commonly referred to as trackball devices, one such trackball device being disclosed, for example, in my copending application Ser. No. 347,469, filed Feb. 10, 1982 and entitled "TRACK-BALL DEVICE". The trackball device includes a ball loosely seated on supports in a housing for universal rotation of the ball, a portion of the ball projecting through an opening in the housing for access by a user so that the user can manually rotate the ball.

Both trackball devices and single-axis position control devices have, heretofore, been characterized by single manual control members which limits the configurations in which the device can be mounted and correspondingly limits the applications of the device.

Furthermore, in prior position control devices, the axis of rotation of the shaft is fixed, and proper operation of the device requires manufacture of the parts to very exacting tolerances. This is quite costly, since it precludes the use of certain inexpensive materials and fabrication techniques. Additionally, such prior devices have tended to be unduly rattly and have exhibited poor shock and impact resistance.

SUMMARY OF THE INVENTION

It is a general object of this invention to provide an improved position control device which avoids the disadvantages of prior devices, while at the same time offering additional structural and operating advantages.

An important object of this invention is the provision of a position control device which permits mounting of the device on differently oriented support surfaces, while at the same time providing ready access to the manual controls by a user.

In connection with the foregoing object, it is another object of this invention to provide a position control device of the type set forth which includes dual manual control means.

Still another object of this invention is the provision of a position control device which affords reliable operation without the necessity for very close tolerances in the manufacture of the parts.

Yet another object of this invention is the provision of a position control device which exhibits improved shock and impact resistance and smooth operation.

These and other objects of the invention are attained by providing a position control device comprising a housing including two walls, each of the walls having an opening therein, a shaft mounted in the housing for rotation about the longitudinal axis thereof, one end of the shaft projecting outwardly through one of the openings, and a circular control member fixedly mounted on the shaft coaxially therewith for rotation therewith, a portion of the control member projecting through the other one of the openings for manual rotation by a user.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary, perspective view of a portion of a horizontal support panel, illustrating the manner in which the position control device of the present invention is mounted therebeneath;

FIG. 2 is a view similar to FIG. 1, illustrating a portion of a vertical control panel, and showing the position control device of the present invention mounted therebehind;

FIG. 3 is a perspective view of the position control device constructed in accordance with and embodying the features of the present invention;

FIG. 7 is a fragmentary view in partial vertical section taken generally along the line 7—7 in FIG. 5;

FIG. 8 is a fragmentary view in horizontal section illustrating an alternative shaft arrangement for use with a control knob; and FIG. 9 is a view similar to FIG. 8, illustrating an alternative shaft arrangement for use without a control knob.

DESCRIPTION OF THE PREFERRED EMBODIMENT

Figure 4:
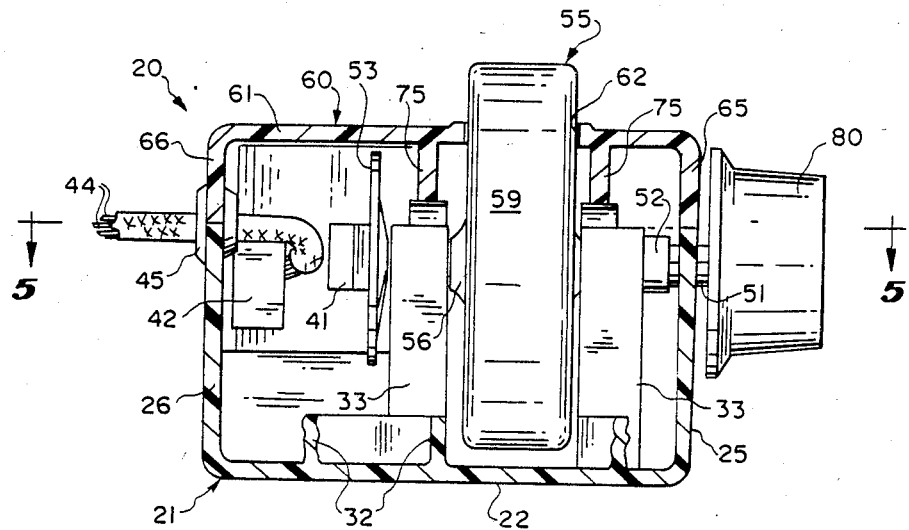
FIG. 4 is a slightly enlarged view in vertical section taken along the line 4—4 in FIG. 3.

Referring now to FIGS. 1 through 3 of the drawings, there is illustrated a position control device, generally designated by the numeral 10, constructed in accordance with and embodying the features of the present invention. The position control device 10 includes a housing 20 in which is mounted a shaft 50 (see FIGS. 5 and 6) rotatably carrying a control wheel 55. It is a significant aspect of the present invention that the housing 20 is adapted to be supported either beneath a horizontal support panel 11, as by mounting screws or bolts 12, with the control wheel 55 projecting upwardly through a complementary rectangular opening 13 in the support panel 11, or behind a vertical support panel 15 having a circular opening (not shown) therein through which one end of the shaft 50 can project.

Referring now also to FIGS. 4 through 7 of the drawings, the housing 20 is a generally rectangular, box-like, two-part construction including a bottom 21 and a cover 60 adapted to be matingly secured together. The bottom 21 includes a rectangular bottom wall 22 integral at the opposite side edges thereof with upstanding side walls 23, each being provided at the upper end thereof with a laterally outwardly extending curved lip 24. The bottom 21 also includes an upstanding front wall 25 and a rear wall 26, respectively provided with arcuate-bottom notches 27 and 28 in the upper edges thereof. Respectively formed in the upper surfaces of the lips 24 and extending the length thereof are two parallel channels 29 (see FIG. 5), each substantially semi-cylindrical in shape.

Integral with the bottom wall 22 and extending upwardly therefrom, respectively adjacent to the four corners thereof, are four assembly tubes 30, respectively surrounding and communicating with complementary openings 30a (see FIG. 7) in the bottom wall 22. Also integral with the bottom wall 22 and extending upwardly therefrom, respectively adjacent to the opposite side walls 23 thereof, are two cylindrical attachment tubes 31 which also surround and communicate with complementary openings in the bottom wall 22. Also integral with the upper surface of the bottom wall 22 are a plurality of interconnected upstanding stiffening webs 32.

Disposed generally centrally of the bottom wall 22 and integral therewith are two upstanding parallel support blocks 33. The facing surfaces of the support blocks 33 are respectively provided with generally U-shaped recesses 34 therein (see FIG. 6) at the upper ends thereof, the recesses 34 respectively having formed in the outer walls thereof smaller U-shaped notches 35 and 35a (FIG. 5) arranged substantially in alignment with each other and with the notch 27 in the front wall 25. Formed in the bottom of each recess 34 and extending downwardly into the support block 33 is a cylindrical bore 36, two helical compression springs 37 being respectively seated in the bores 36 coaxially therewith (one shown—see FIG. 6).

Figure 5:
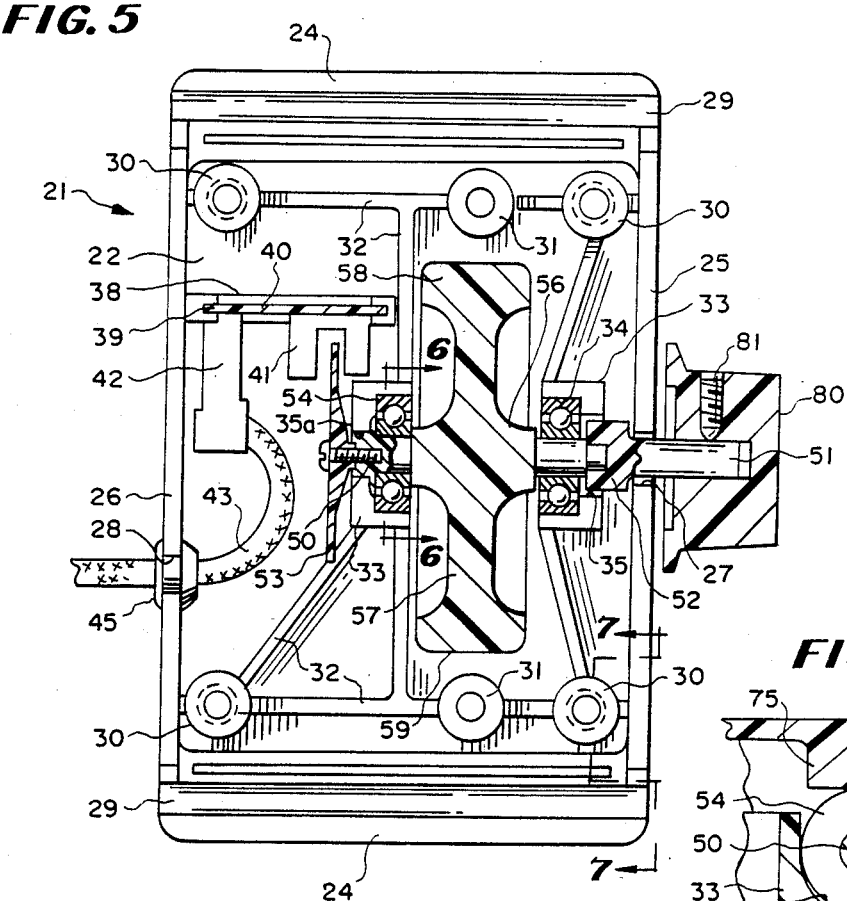
FIG. 5 is a view in horizontal section taken along the line 5—5 in FIG. 4.

Also integral with the bottom wall 22 and extending upwardly therefrom substantially perpendicular to the rear wall 26 is a generally rectangular U-shaped mounting wall 38 provided with a groove or channel 39 therein for receiving an upstanding circuit board 40 (see FIG. 5). Mounted on the circuit board 40 is a transducer 41, which is of standard construction and includes spaced apart portions defining a slot therebetween, one of the portions carrying two vertically aligned light sources, such as LED's, and the other portion carrying two vertically aligned light responsive elements, such as phototransistors. Also mounted on the circuit board 40 is a connector 42 which may be of the plug and socket type, the plug portion thereof being fixedly secured to one end of a cable 43 comprising a plurality of electrically conductive wires 44. The cable 43 extends through a cylindrical grommet 45 which is seated in the notch 28 in the rear wall 26, and is provided at the other end thereof with a connector plug 46 (FIG. 3) for connecting to associated equipment, such as a video game or the like.

Mounted in the bottom 21 of the housing 20 is the elongated shaft 50 provided at one end thereof with an extender 51 which projects outwardly through the notch 27 in the front wall 25 and is provided with an enlarged-diameter spacer portion 52 seated in the notch 35 of the front one of the support blocks 33. The other end of the shaft 50 is seated in the notch 35a of the rear one of the support blocks 33 so that the shaft 50 is supported with the longitudinal axis thereof disposed substantially perpendicular to the front wall 25. Fixedly secured to the inner end of the shaft 50 is a code wheel 53 provided with a plurality of apertures therethrough around the perimeter thereof in a well known manner, the code wheel 53 being positioned for rotation in the slot of the transducer 41 so that, in operation, the light beams from the LED's pass through the apertures in the code wheel 55 to the phototransistors to provide a series of pulse control signals as the code wheel 53 rotates. These signals may be modified by circuitry carried by the circuit board 40 and are fed over the cable 43 to the associated equipment with which the position control device 10 is to be used.

Fixedly secured to the shaft 50 at spaced apart locations thereon are two ball bearings 54, respectively seated in the recesses 34 in the support blocks 33 for free rotation of the shaft 50. Fixedly secured to the shaft 50 between the ball bearings 54 is the control wheel 55 having a hub portion 56 and an outer cylindrical portion 58 interconnected by a circular web 57, the cylindrical portion 58 having an outer cylindrical surface 59 which is disposed substantially parallel to the side walls 23 when the shaft 50 is mounted in place in the manner described above.

The cover 60 of the housing 20 includes a substantially flat, rectangular, top wall 61 having a rectangular opening 62 therein. Integral with the top wall 61 at the opposite side edges thereof are two downwardly sloping side walls 64. Also integral with the top wall 61 at the front and rear edges thereof, respectively, are two depending, parallel, front and rear walls 65 and 66. The front wall 65 is provided with a depending tab 67 intermediate the ends thereof (see FIG. 1). The sloping side walls 64 are provided with coplanar bottom surfaces parallel to the top wall 61 and respectively provided with elongated parallel channels 69 (see FIGS. 3 and 7) extending the length thereof and each substantially semi-cylindrical in shape.

In use, after the circuit board 40 and cable 43 have been mounted in place and the shaft 50 and control wheel 55 have been seated on the support blocks 33, the cover 60 is assembled with the housing bottom 21 for cooperation therewith to define an enclosure. More specifically, the peripheral edges of the cover 60 respectively mate with those of the bottom 21, the tab 67 being fitted in the upper end of the notch 27 for retaining the extender 51 of the shaft 50 in place. The outer surfaces of the bottom front wall 25 and the cover front wall 65 are substantially coplanar and cooperate to define a continuous front wall 70 for the housing 20 which is substantially perpendicular to the cover top wall 61 (see FIG. 3). Formed integral with the cover top wall 61 and depending therefrom are four cylindrical assembly posts 71 (one shown—FIG. 7) provided with internally threaded bores which are aligned respectively with the assembly tubes 30 for receiving suitable fasteners such as screws 73 fixedly to secure the bottom 21 and cover 60 together.

When the cover 60 and the bottom 21 are thus assembled together, the upper portion of the control wheel 55 projects upwardly through the rectangular opening 62 in the cover top wall 61, the dimensions of the opening 62 being such as to permit free manual rotation of the control wheel 55 by a user. It will be appreciated that this rotation effects a corresponding rotation of the shaft 50 and the code wheel 53 for generating a plurality of control signals for controlling the operation of an associated device such as the cursor of a video game or the like.

Also integral with the cover top wall 61 and dependent therefrom are two attachment tubes (not shown) respectively disposed in alignment with the attachment tubes 31 on the bottom 21 for cooperation therewith to define two attachment passages 72 (see FIG. 3) extending vertically all the way through the housing 20 and adapted for receiving therethrough the mounting screws or bolts 12, which may cooperate with associated nuts (not shown) fixedly to secure the position control device 10 in a first mounted configuration on a horizontal support panel 11. More specifically, in this first mounted configuration, the cover 60 is disposed immediately beneath and parallel to the support panel 11, with the exposed portion of the control wheel 55 projecting upwardly through the rectangular opening 13 in the support panel 11 for access by a user. In this arrangement, the user effects a manual rotation of the control wheel 55 by using the palm of his hand in much the same manner as the ball of a trackball device is rotated.

Figure 6:
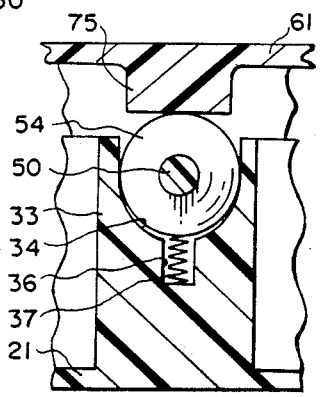
FIG. 6 is a fragmentary view in vertical section taken along the line 6—6 in FIG. 5.

It is a significant aspect of the present invention that the compression springs 37 resiliently urge the ball bearings 54 upwardly from the bottoms of the recesses 34, so that the tops of the ball bearings 54 project a slight distance upwardly above the upper ends of the support blocks 33 (see FIG. 6). Integral with the top wall 61 of the cover 60 are two depending retaining plates 75 which are respectively disposed for engagement with the upper surfaces of the ball bearings 54 when the cover 60 is assembled with the bottom 21 to limit the upward movement of the ball bearings 54, and for cooperation with the recesses 34 in the support blocks 33 to retain the ball bearings 54 and the shaft 50 in place. Thus, it will be appreciated that the parts are so dimensioned that when the position control device 10 is in a normal rest position, the control wheel 55 is spaced a very slight distance from the peripheral edges of the rectangular opening 62, and the extender 51 of the shaft 50 is spaced a very slight distance from the lower end of the tab 67 to accommodate free rotation of the control wheel 55 on the shaft 50. However, an advantage of the present invention is that, even if the tolerance of the parts is such that the control wheel 55 touches the cover 60 at the rectangular opening 62, the free space provided between the ball bearings 54 and the bottoms of the recesses 54 accommodates a slight downward movement of the shaft 50 and the control wheel 55 in response to contact with the user's hand, against the urging of the springs 37, so that the control wheel 55 can be freely rotated. Thus, it will be understood that the parts can be fabricated without critical tolerances. Also, the springs 37 serve to cushion the parts of the position control device 10 against the shock of sudden impacts. The resilience of the springs 37 also provides a smooth and substantially rattle-free operation of the position control device 10.

It is a fundamental feature of the present invention that the position control device 10 is adapted not only for mounting in the configuration illustrated in FIG. 1, but it may also be mounted in an alternative configuration illustrated in FIG. 2, wherein the front wall 70 of the housing 20 is disposed against the rear surface of a vertical support panel 15. In this regard, it will be noted that the channels 69 on the cover 60 respectively cooperate with the channels 29 on the bottom 21 for defining two horizontally extending attachment passages 74 (see FIG. 3) which extend front-to-back all the way through the housing 20 for receiving fasteners such as screws or bolts 12 which may cooperate with associated nuts (not shown) securely to fasten the position control device 10 on the vertical support panel 15, as illustrated in FIG. 2. In this configuration, the extender 51 of the shaft 50 projects forwardly through a complementary opening (not shown) in the support panel 15. Since the control wheel 55 is not accessible to the user in this configuration, there is also provided a control knob 80 which may be fixedly secured to the projecting outer end of the extender 51, as by a set screw 81 (see FIG. 5). In this configuration, the user manually rotates the knob 80 to effect a rotation of the shaft 50 and the code wheel 53.

Referring to FIGS. 8 and 9, there is illustrated an alternative shaft arrangement for the control device 10, wherein the shaft for the control wheel 55 and the control knob 80 is of unitary one-piece construction. Thus, where the control knob 80 is to be used, a single-piece shaft 50a is provided which extends outwardly through the notch 27 in the housing front wall 25 for accommodating the control knob 80 thereon. Referring to FIG. 9, where the control knob 80 is not used, there is provided a one-piece shaft 50b, the outer end of which is journaled in the notch 27, but which does not extend outwardly substantially beyond the cover front wall 25.

Thus, it will be appreciated that the position control device 10 affords a unique flexibility in that it can readily be mounted on either horizontal or vertical support panels, while still providing manually rotatable control members readily accessible to a user for effecting rotation of the shaft 50. In the preferred embodiment of the invention, the position control device 10 would be assembled with the control wheel 50 as a standard part thereof, the control knob 80 being provided for installation at the user's option.

In a constructional model of the present invention, the bottom 21 and the cover 60 of the housing 20 are preferably integrally formed of molded plastic. The control wheel 55 may be formed of a plastic resin, such as ABS. If desired, the cylindrical outer surface 59 of the control wheel 55 may be provided with a ribbing or the like to facilitate frictional engagement thereof with the user's hand.

From the foregoing, it can be seen that there has been provided an improved position control device, which permits mounting on either horizontal or vertical support panels, and which permits free operation of the control members without the necessity of close tolerances in the manufacture of the parts, this improved construction also affording a cushioned operation of the device.

I claim:

1. A position control device adapted to be mounted on an associated fixed support, said position control device comprising a housing, means for immovably mounting said housing on the associated support, said housing including two walls, each of said walls having an opening therein, a shaft mounted in said housing for rotation about the longitudinal axis thereof, one end of said shaft projecting outwardly through one of said openings, and a circular control member fixedly mounted on said shaft coaxially therewith for rotation therewith, a portion of said control member projecting through the other one of said openings for manual rotation by a user.

2. The position control device of claim 1, wherein said one opening is elongated and substantially arcuate at one end thereof, said other opening being substantially rectangular in shape.

3. The position control device of claim 1, and further including a control knob fixedly secured to said one end of said shaft outside of said housing for manual rotation of said shaft.

4. The position control device of claim 1, wherein said mounting means includes means associated with said housing for fixedly securing either one of said walls to the associated support.

5. The position control device of claim 1, and further including signal generating means disposed in said housing and associated with said shaft for generating control signals in response to rotation of said shaft.

6. The position control device of claim 1, wherein said housing comprises two parts matingly fitted together for cooperation to define an enclosure.

7. The position control device of claim 6, wherein said two parts cooperate to form one of said walls.

8. The position control device of claim 6, wherein one of said parts has first attachment portions and the other of said parts has second attachment portions, said first attachment portions respectively cooperating with said second attachment portions for forming attachment means to accommodate attachment of either one of said walls to an associated support surface.

9. The position control device of claim 8, wherein said attachment means comprise tubular passages for accommodating associated fasteners.

10. The position control device of claim 3, and further including shaft extension means immovably carried by said shaft and projecting outside of said housing, said control knob being fixedly secured to said shaft extension means.

11. A position control device comprising a housing including two walls, each of said walls having an opening therein, a shaft mounted in said housing and having one end thereof projecting outwardly through one of said openings, mounting means in said housing supporting said shaft for rotation about the longitudinal axis thereof, said mounting means accommodating movement of said shaft in directions toward and away from the other one of said openings, bias means resiliently urging said shaft toward said other one of said openings, and a circular control member fixedly mounted on said shaft coaxially therewith for rotation therewith, a portion of said control member projecting through said other one of said openings for manual rotation by a user.

12. The position control device of claim 11, wherein said mounting means includes support structure carried by said housing and bearing means on said shaft and supported by said support structure for accommodating free rotation of said shaft.

13. The position control device of claim 12, wherein said bearing means includes two ball bearings respectively disposed on opposite sides of said control member, said support structure including two support members respectively supporting said ball bearings.

14. The position control device of claim 13, wherein said bias means includes two helical compression springs respectively associated with said support members.

15. The position control device of claim 11, wherein said housing includes two parts matingly fitted together for cooperation to define an enclosure.

16. The position control device of claim 15, wherein said mounting means includes bearing means on said shaft, support structure on one of said housing parts for supporting said bearing means thereon, said bias means being carried by said support structure and engaging said bearing means, and retaining structure on the other of said housing parts engageable with said bearing means for limiting movement thereof by said bias means.

17. The position control device of claim 16, wherein said bearing means includes two ball bearings respectively disposed on opposite sides of said control member, said support structure including two support members respectively supporting said ball bearings, said retaining structure including two retaining members respectively engageable with said ball bearings.

18. The position control device of claim 11, and further including a control knob fixedly secured to said one end of said shaft outside of said housing for manual rotation of said shaft.

* * * * *